Patented May 21, 1940

2,201,926

UNITED STATES PATENT OFFICE 2,201,926

RESIN SOLUTIONS FROM DIETHERS OF DIMETHYLOL UREA

Ben E. Sorenson, Upper Darby, Pa., assignor to E. I. du Pont de Nemours & Company, Wilmington, Del., a corporation of Delaware No Drawing. Application December 17, 1937, Serial No. 180,455

2 Claims. (Cl. 260—29)

This invention relates to the production of resinous materials from crystalline products and more particularly to the production of resin solutions from diethers of dimethylol urea.

As is known, colorless, transparent, hard resins are formed by heating the compounds resulting from the reaction product of dimethylol urea and alcohol. The further treatments of these resins which have previously been proposed do not, however, result in the solutions of the resins described herein.

This invention has as an object a process for making solutions of urea-formaldehyde resins obtained from di-ethers of dimethylol urea. A further object resides in new and useful solutions of such resins. Other objects will appear hereinafter.

The diethers from which the resin solutions of this invention are made may be prepared in the known way, but they are preferably made according to the new methods described in my applications Serial Numbers 180,454 and 180,456, filed of even date herewith. One of these methods consists in heating at relatively low temperatures (50° C. to 125° C.) the non-resinous reaction product of urea and formaldehyde known as dimethylol urea with the alcohol in the presence of anhydrous magnesium sulphate until the diether is formed. By this method it is also possible to obtain the diethers of dimethylol urea and iso or secondary alcohols, as for instance isobutyl, isopropyl, secondary butyl, etc., which could not be obtained by the previous methods. The other mentioned method consists in wetting the methylol compounds with water and then reacting with the alcohol in the presence of an acid catalyst. By this method it is also possible to prepare ethers, as for instance monomethylol urea isobutyl ether, monomethylol urea normal butyl ether, etc., which have not before been obtainable.

With regard to the present invention which is concerned with the production of solutions of resins formed from diethers of dimethylol urea, I have found that resin solutions may be readily and satisfactorily produced by heating the crystalline diethers under conditions preventing the loss of freed solvent, as for instance under a reflux condenser, and that resin solutions are produced having a substantially definite solids content.

When the alkyl or aryl diether is heated sufficiently under suitable conditions part of the alcohol combined in an ether linkage splits out and the liberated alcohol acts as a solvent for the polymeric alkyl or aryl ether of methylol methylene urea thus formed. The reaction may be illustrated by the following equation:

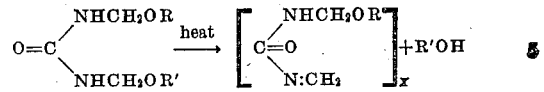

R and R' represents alkyl or aryl radicals. In the case of the new ethers described in mentioned application Serial Number 180,454, at least one of the hydrocarbon radicals R and R' is an iso or secondary radical.

When the alcohol which splits off is not allowed to escape but is retained in the reaction vessel the reaction reaches an equilibrium and a resin solution is obtained which does not gel on prolonged heating under a reflux condenser. The solids content of the resin solution varies with the particular diether used and in general is approximately equal to the molecular weight of the diether used minus one molecule of the alcohol corresponding to the ether radical in the crystalline compound. When a coating is formed from a resin solution of this type and "cured" by baking, the alcohol volatilizes and a hard, tough and insoluble film is produced. The resinification of the crystalline materials may be carried out in the presence of an acid catalyst or in the absence of a catalyst, that is, by using the diether alone.

The following examples are further illustrative of methods used in practicing my invention:

Example I

Four hundred parts of dimethylolurea di-isobutyl ether was placed in a 1 liter flask suitably equipped with a thermometer and a reflux condenser. Heat was applied to the flask and the crystalline diether gradually melted. The temperature of the liquid in the flask rose to 130° C. after which it gradually dropped to approximately 123° C. and remained stationary at this point indicating that an equilibrium had been reached. The time necessary to reach the point of apparent equilibrium was approximately four to six hours. The time factor would, of course, vary with the quantity of material being resinified. The resin solution thus obtained had a solids content of 68% and a viscosity of Z1 on the Gardner-Holdt scale. Coatings of this resin solution when baked at 100° C. produced insoluble films in about 24 hours. If an acid or acid forming catalyst is added to the resin solution coatings may be made to produce films by baking at 100° C. for from approximately one-half to 1 hour. The baking schedule may conveniently be varied to suit particular needs, such variations being controlled by the catalyst used.

Pigmented coating compositions may be prepared from such resin solutions by the incorporation of suitable pigments, dyes, filler, softeners, plasticizers or blending agents, cellulose derivatives, solvents and/or thinner, etc. according to procedures well known to those skilled in the art.

*Example II*

Four hundred parts of dimethylol urea di-isobutyl ether were placed in a flask fitted with a thermometer and a reflux condenser and 4 parts of phthalic anhydride added. Heat was applied and the diether melted, the temperature of the liquid rising to approximately 123° C. As the crystalline material disappeared the temperature rapidly dropped to approximately 122° C. where it remained constant indicating that a state of equilibrium had been reached. This state of equilibrium was reached in from 1–2 hours. The resin solution thus produced was found to have a solids content of 67.9% and a viscosity of Z5 on the Gardner-Holdt scale. It possessed properties similar to the resin solution produced according to Example I and was used in a similar manner.

*Example III*

Five hundred parts of dimethylol urea di-normal butyl ether were placed in a flask together with 5 parts of phthalic anhydride, the flask being fitted with a suitable stirrer, thermometer and a reflux condenser. Heat was applied to the flask and after the diether had melted the mass was agitated with the stirrer. The temperature rose to 136° C. and after approximately 1–2 hours dropped to 131° C. indicating that a state of equilibrium had been reached. The resin solution thus obtained had a solids content of 66.7%. The resin solution thus obtained had a viscosity of approximately Z3 on the Gardner-Holdt scale and possessed properties and was used in a manner similar to the resins obtained according to Examples I and II.

*Example IV*

Five hundred parts of dimethylol urea dimethyl ether and 5 parts of phthalic acid were treated as in Example III. The temperature of the melted material in the flask rose to 91.5° C. and then dropped to 81° C. in approximately 2½ hours. The resin solution thus obtained had a solids content of 80.0% and a viscosity of A on the Gardner-Holdt scale after the solids were reduced to 50% by the further addition of methyl alcohol to the resin solution. A coating prepared from the resin solution bakes to a hard film in approximately 30 minutes at 100° C. The film is, however, somewhat water sensitive even after being baked for 24 hours at 100° C.

*Example V*

Four hundred and sixty parts of dimethylol urea diisopropyl ether and 4.6 parts of phthalic anhydride were treated as in Example III. The crystalline material melted and the temperature rose to a maximum of 99° C. after which it gradually dropped and reached an equilibrium at 92° C. in approximately 3–4 hours. The resin solution thus obtained had a solids content of 66.0% and when reduced to a solids content of 50% with isopropyl alcohol had a viscosity of D on the Gardner-Holdt scale. Coatings of the resin solution baked to hard films in from ½ to 1 hour at 100° C.

*Example VI*

Five hundred parts of dimethylol urea di-secondary butyl ether and 5 parts of phthalic anhydride were treated as in the previous examples. As the crystalline material melted the maximum temperature reached was 112° C. and an equilibrium temperature of 108–109° C. was reached after refluxing for approximately 2–3 hours. The resin solution had a solids content of 61% and the viscosity of a 50% solids content solution (prepared by the addition of a sufficient quantity of secondary butyl alcohol) was N on the Gardner-Holdt scale. Coatings of the resin solution baked to hard and tough films in approximately 1 hour at 100° C.

The resin solutions prepared according to the present invention may be used with the high concentration solids or they may be diluted to any desired concentration by the addition of suitable solvents and thinners.

It will be apparent from the above description that I have discovered a method for producing resinous solutions from crystalline alkyl or aryl diethers of dimethylol urea which is simple and easily operable and which produces solutions of high concentration. Such solutions are stable and show no tendency to gelling on long continued storage. The equipment for producing the resin solutions is simple and no unusual precautions such as maintaining a definite pH range, unusual control of temperature, neutralization operation, etc., are necessary. Other advantages of the process and products produced thereby will be readily apparent to those accustomed to the preparation and use of resinous solutions of the presently described type.

As many apparently widely different embodiments of this invention may be made without departing from the spirit and scope thereof, it is to be understood that I do not limit myself to the specific embodiments thereof except as defined in the appended claims.

I claim:

1. A process for forming urea-formaldehyde resinous solutions which comprises heating crystalline di-ether of di-methylol urea alone under a reflux condenser and continuing the heating therein of the molten di-ether until the polymeric ether of methylene urea is formed and the liberated hydroxylated solvent dissolves said last-mentioned ether.

2. The process set forth in claim 1 in which said di-ether is one of the class consisting of di-isoalkyl ethers of dimethylol urea and di-secondary alkyl ethers of dimethylol urea.

BEN E. SORENSON.